UNITED STATES PATENT OFFICE.

JOHN M. RAUHOFF, OF CHICAGO, ILLINOIS, ASSIGNOR TO IRONITE COMPANY, OF CHICAGO, ILLINOIS, A CORPORATION OF ILLINOIS.

CONCRETE COMPOSITION.

1,000,944. Specification of Letters Patent. Patented Aug. 15, 1911.

No Drawing. Application filed August 23, 1909. Serial No. 514,198.

*To all whom it may concern:*

Be it known that I, JOHN M. RAUHOFF, a citizen of the United States, residing at Chicago, in the county of Cook and State of Illinois, have invented certain new and useful Improvements in Concrete Composition, of which the following is a specification.

This invention relates to an improvement or discovery in the art of manufacturing artificial stone, cement, concrete, mortar and other analogous productions and particularly to the compositions.

It is well known that one of the most desired characteristics of cementitious compositions and products, at the present time, in connection with physical resistance, is impermeability to water. The demand is now for a cement or concrete composition that will meet the most exacting requirements of masonry in building and engineering structures, and which will present a tensile resistance, dispensing with the necessity for the use of steel or metal reinforcement. This demand is not only found in a wide range of engineering structures, but also in its application to buildings both *en masse* and in the form of blocks.

One of the greatest difficulties in the use of cement and concrete is that it is porous and permits water to percolate therethrough. Even when not subjected to direct action of water it will, due to its natural affinity, absorb moisture in the air. Cement and concrete are also subject to rapid disintegration, due to the effect of atmospheric changes, the disintegration being caused more because of the porous nature of the material than for any other reason.

One of the objects therefore, of this invention, is to incorporate with a cementitious, concrete or analogous composition, an element or substance capable of effecting oxidation in the process of changing from a plastic condition to a solid, completely filling the pores and rendering the finished product impervious to liquids and capable of resisting severe atmospheric changes.

Another object is to incorporate in a cementitious composition, an element or substance that possesses fireproofing qualities, which will mechanically and chemically unite with the waterproofing substance, causing oxidation and form a binder or filler that will effect a dense homogeneous cementation.

In distinguishing from my Patent No. 830,003, bearing date of September 6, 1906, it may be stated that the subject matter of the present invention is a substance to be incorporated with and become an integral part of cementitious compositions and not merely a superficial covering or coating for a wall or surface, although it can be used for such purposes.

The waterproofing substance comprises a metallic element preferably iron or an iron ore. This element is reduced to a degree of fineness and then thoroughly mixed with any of the regular cement or concrete admixtures. When a concrete plastic composition is made into stone slabs, building blocks and other commercial forms, the metallic element permeating the mass will be converted into an oxid and the corrosion or rust caused to swell or expand and tightly close the pores or interstices against the penetration of water or the absorption of moisture.

The fireproofing element is composed of asbestos. Before being used the asbestos element will ordinarily have all associated foreign matter separated therefrom. The proportion of foreign matter associated with asbestos differs somewhat as to locality. Some grades might be found sufficiently free from objectionable matter as to permit of its being used in its natural state. The treated asbestos is however preferred as affording the most satisfactory results in practical use. Before being incorporated in the composition the asbestos is reduced to a powder or proper degree of fineness.

If the operation, of reducing the metal and asbestos elements to a powder, is by grinding, then both elements may be ground together and thus more uniformly facilitating the operation of mixing, than if ground separately and mixed afterward. In some instances, either element, of what will be termed a binder compound, may be omitted, without departing from the spirit of this invention.

In practical application, the binder compound, comprising the metallic and asbestos elements are incorporated with the cement or concrete elements in the presence of a liquid, as water, and thoroughly mixed and worked into the proper consistency. A wet mixture, not only causes all ingredients of the composition to run together in a closer union and solidity, but it enables the finer elements of the aggregate to flow freely into the spaces between the coarser particles, thus gaining a more continuous and dense interior mass. The binder compound will impart to a cement or concrete product, a homogeneous cohesion not ordinarily present.

In setting, after the air and surplus water has been compressed therefrom, the cementing process will continue for a long period of time and until a degree of hardness is reached that will make the product practically indestructible.

The binder portion may be compounded in a dry state, for transportation to the point of use.

Having thus described my invention, what I claim is:—

1. As a new article of manufacture, a concrete composition comprising a cementitious composition, and a metallic element in the form of a fine dust capable of undergoing complete oxidation.

2. As a new article of manufacture, a concrete composition comprising a cementitious composition, and metallic iron in the form of a fine dust.

3. As a new article of manufacture, a concrete composition comprising a cementitious composition, an element in the form of a fine dust capable of undergoing complete oxidation, and asbestos.

In testimony whereof I affix my signature in presence of two witnesses.

JOHN M. RAUHOFF.

Witnesses:
VAIL R. BUCKLIN,
L. B. COUPLAND.

Copies of this patent may be obtained for five cents each, by addressing the "Commissioner of Patents, Washington, D. C."